125,628

UNITED STATES PATENT OFFICE.

JOHN S. STRATTON, OF NEWFANE, VERMONT.

IMPROVEMENT IN SURGICAL AND FRESH-WOUND LINIMENTS.

Specification forming part of Letters Patent No. 125,628, dated April 9, 1872.

SPECIFICATION.

I, JOHN S. STRATTON, of Newfane, in the county of Windham and State of Vermont, have invented a certain compound called "Surgical and Fresh-Wound Liniment," to be used for cleansing and healing all wounds, sores, and inflammations on both the human and animal kind.

The nature of the invention is in mixing oil of wormwood, olive-oil, sal-niter, alum, and alcohol in parts or proportions as follows, viz.: one of wormwood, two of olive-oil, one of sal-niter, two of alum, and thirty-two of alcohol. When properly mixed as aforesaid it is ready for use, and its beneficial qualities are not excelled.

Claim.

I claim as my invention—

The manufacture or preparation of the compound which is denominated "Surgical and Fresh-Wound Liniment," of the ingredients, in the proportions, and for the purposes set forth.

JOHN S. STRATTON.

In presence of—
R. W. CLARKE,
C. H. MANSUR.